United States Patent
Adlung et al.

(10) Patent No.: US 7,693,811 B2
(45) Date of Patent: Apr. 6, 2010

(54) GENERATING UNIQUE IDENTIFIERS FOR LOGICAL PARTITIONS

(75) Inventors: Ingo Adlung, Altdorf (DE); Gerhard Banzhaf, Nufringen (DE); Frank William Brice, Jr., Hurley, NY (US); Giles Roger Frazier, Austin, TX (US); Stefan Mueller, Holzgerlingen (DE); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 11/364,466

(22) Filed: Feb. 28, 2006

(65) Prior Publication Data

US 2007/0203943 A1  Aug. 30, 2007

(51) Int. Cl.
G06F 7/00  (2006.01)

(52) U.S. Cl. .............................. 707/1; 707/8

(58) Field of Classification Search ....... 707/1
See application file for complete search history.

(56) References Cited

U.S. PATENT DOCUMENTS

| | | | |
|---|---|---|---|
| 5,530,887 A | 6/1996 | Harper et al. | |
| 5,659,756 A * | 8/1997 | Hefferon et al. | 710/200 |
| 6,219,799 B1 | 4/2001 | Kandasamy | |
| 6,243,767 B1 | 6/2001 | Young | |
| 6,532,538 B1 | 3/2003 | Cronk et al. | |
| 6,567,841 B1 * | 5/2003 | Rooney et al. | 718/104 |
| 6,687,717 B1 | 2/2004 | Hamilton et al. | |
| 6,807,579 B1 * | 10/2004 | Frazier | 709/245 |
| 6,813,686 B1 | 11/2004 | Black | |
| 7,051,180 B2 * | 5/2006 | Downer et al. | 711/173 |
| 7,215,637 B1 * | 5/2007 | Ferguson et al. | 370/230.1 |
| 2004/0010624 A1 | 1/2004 | Garofalo et al. | |
| 2004/0215858 A1 | 10/2004 | Armstrong et al. | |

FOREIGN PATENT DOCUMENTS

| | | |
|---|---|---|
| CN | 1186286 A | 7/1998 |
| EP | 0301275 A2 | 2/1989 |
| EP | 1378830 A1 | 1/2004 |
| JP | 2003005045 A | 1/2003 |

OTHER PUBLICATIONS

"ANSI/INCITS 373—Information Technology—Fibre Channel Framing and Signaling Interface (FC-FS)", International Committee for Information Technology Standards, Working Draft, Aug. 9, 2005, pp. 1-416.

* cited by examiner

*Primary Examiner*—Charles Rones
*Assistant Examiner*—Mellissa M. Chojnacki
(74) *Attorney, Agent, or Firm*—Yee & Associates, P.C.; Libby Z. Toub

(57) ABSTRACT

A computer-implemented method, apparatus, and computer-usable program code to generate unique identifiers for a logically partitioned and/or virtualized data processing system. A number of computing entities supported by the data processing system are identified to form a number of identified entities. A set of unique identifiers is generated based upon the number of identified entities. A unique identifier from the set of unique identifiers is assigned to a logical computing entity during operation of the data processing system.

3 Claims, 7 Drawing Sheets

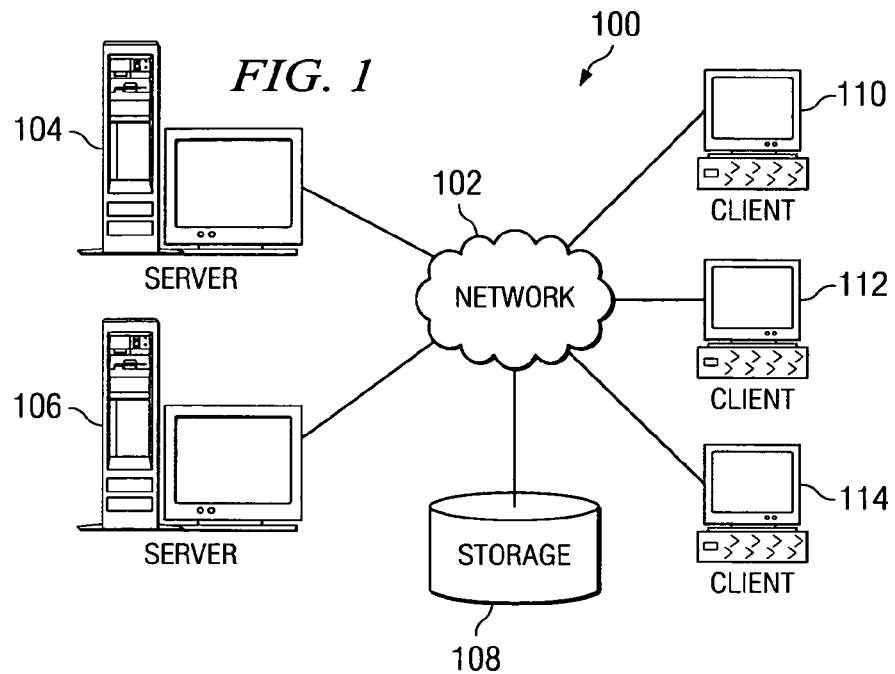
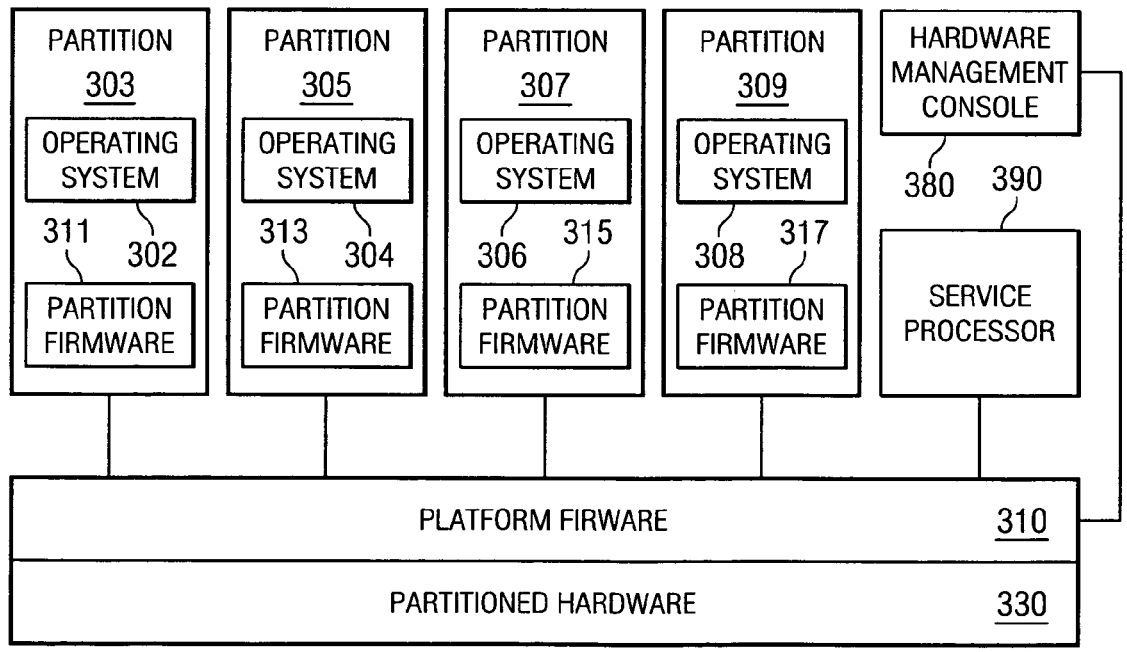

GENERATING UNIQUE IDENTIFIERS FOR LOGICAL PARTITIONS

BACKGROUND OF THE INVENTION

1. Field of the Invention

The present invention relates generally to an improved data processing system and, in particular, to a method, apparatus, and computer program product for identifying independent logical computing entities within a physical computer, such as logical partitions and virtual machines. Still more particularly, the present invention relates to a computer-implemented method, apparatus, and computer program product for automatically generating identifiers of these logical computing entities that are unique worldwide or, more particularly, within the fabric of a network.

2. Description of the Related Art

In a data processing system having multiple computing entities with varying levels of access to external resources in a fabric, and varying accountability for those external resources, a unique computing entity uses a unique identifier for each input/output (I/O) port into the fabric in order to distinguish one unique entity from another when sharing a port. For example, each computing entity that shares an I/O device with another computing entity through an I/O-adapter port needs to be uniquely identifiable by that I/O device.

Physical I/O-port hardware usually contains a serial number or other unique identifier that can be used to uniquely identify a computing entity using the port. However, in logically partitioned or virtualized data processing systems, a single physical computing entity can be divided into a plurality of logical partitions or virtual machines, some or all of which may share a port so as to better utilize an I/O adapter.

A logical partition is a portion of a computing entity with dedicated memory that is capable of operating independently of other portions of the same computing entity in a data processing system. Each logical partition generally uses a subset of physical system resources and runs a separate instance of an operating system.

A virtual machine likewise comprises a subset of physical system (or logical partition) resources, and is typically the creation of a hypervisor operating system that controls and manages a set of virtual machines. Each virtual machine is capable of operating independently of other virtual machines controlled by the hypervisor and uses a subset of physical system (or logical partition) resources as allowed by the hypervisor. Each virtual machine runs a separate instance of an operating system in virtual memory managed via paging by the hypervisor.

Just as there is a need to uniquely identify each physical computing entity utilizing an I/O port in data processing systems that are not partitioned or virtualized, there is also a need to uniquely identify each logical computing entity sharing such an I/O port, such as logical partitions and virtual machines. Because each logical computing entity requires a unique identifier associated with each port, and multiple logical entities can be associated with physical hardware, utilization of an identifier associated with the underlying physical hardware is generally inadequate.

In data processing systems comprising a small number of logical entities, the creation of unique identifiers for each computing entity can be performed manually. However, larger data processing systems may contain hundreds, thousands, or even millions of logical computing entities. Manually generating a sufficient number of unique identifiers for each one of these entities in such a system is cumbersome and impractical.

SUMMARY OF THE INVENTION

The aspects of the present invention provide a computer-implemented method, apparatus, and computer program product to generate unique identifiers for a logically partitioned data processing system. A number of computing entities supported by the data processing system are identified to form a number of identified entities. A set of unique identifiers is generated based upon the number of identified entities. A unique identifier from the set of unique identifiers is assigned to a logical computing entity during operation of the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which aspects of the present invention may be implemented;

FIG. 3 is a block diagram of an exemplary logically partitioned platform in which the present invention may be implemented;

DETAILED DESCRIPTION OF THE PREFERRED EMBODIMENT

Figure 2:
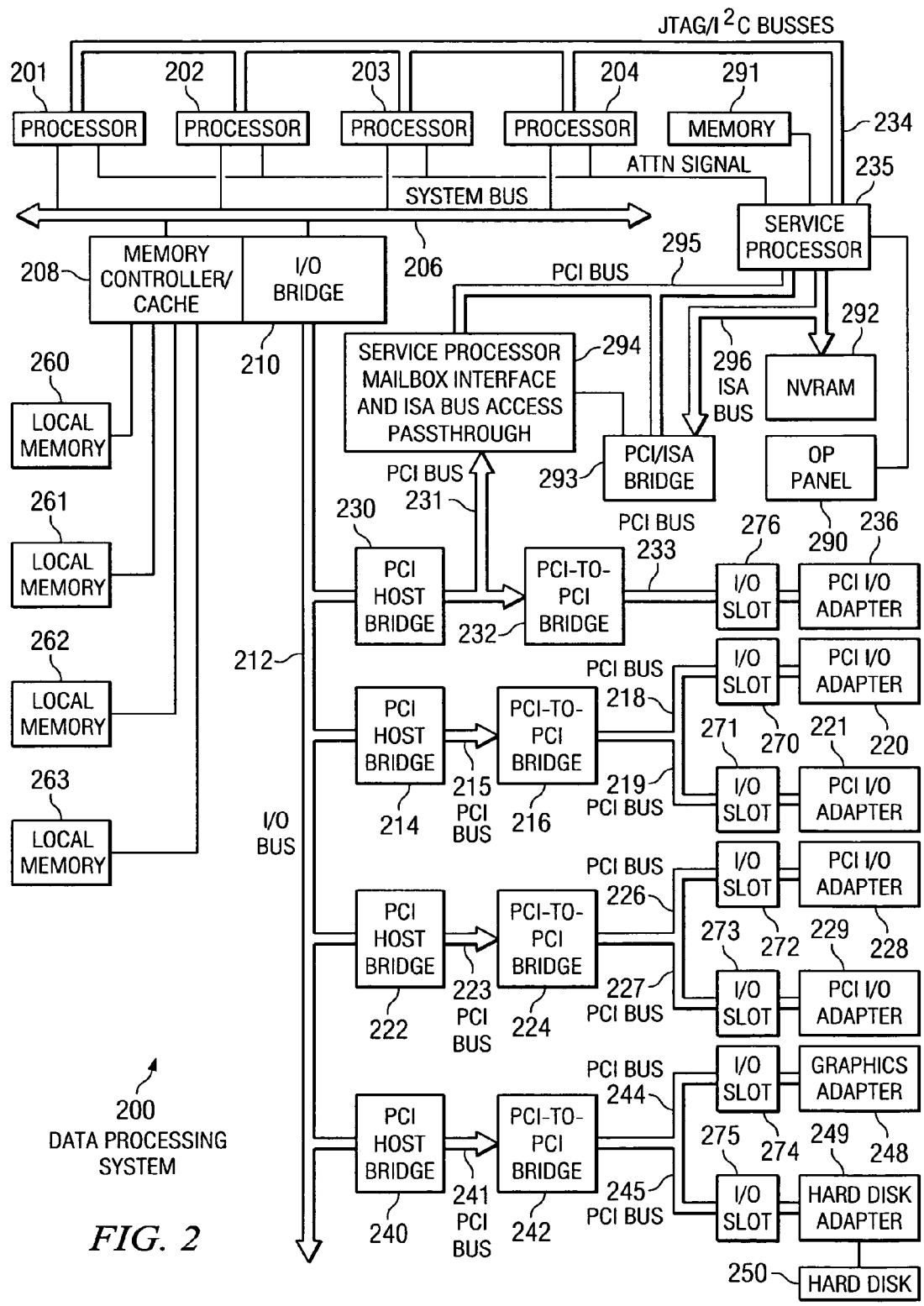
FIG. 2 is a block diagram of a data processing system in which the present invention may be implemented.

With reference now to the figures and in particular with reference to FIGS. 1-3, exemplary diagrams of data processing environments are provided in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is a fabric comprising the media used to provide communications between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). Likewise, the storage devices in network data processing system 100 may be connected to the servers 104 and 106 via an alternative protocol such as the Fibre Channel Protocol. FIG. 1 is intended as an example, and not as an architectural limitation for different embodiments of the present invention.

With reference now to FIG. 2, a block diagram of a data processing system in which the present invention may be implemented is depicted. Data processing system 200 may be a symmetric multiprocessor (SMP) system including a plurality of processors 201, 202, 203, and 204, which connect to system bus 206. For example, data processing system 200 may be an IBM eServer, a product of International Business Machines Corporation in Armonk, N.Y., implemented as a server within a network. Alternatively, a single-processor system may be employed. Also connected to system bus 206 is memory controller/cache 208, which provides an interface to a plurality of local memories 260-263. I/O bus bridge 210 connects to system bus 206 and provides an interface to I/O bus 212. Memory controller/cache 208 and I/O bus bridge 210 may be integrated as depicted.

Data processing system 200 may be a logically partitioned or virtualized data processing system. Thus, data processing system 200 may have multiple heterogeneous operating systems (or multiple instances of a single operating system) running simultaneously. Each of these multiple operating systems may have any number of software programs executing within it. Data processing system 200 may be logically partitioned or virtualized such that different PCI I/O adapters 220-221, 228-229, and 236, graphics adapter 248, and hard disk adapter 249 may be assigned to different logical computing entities. In this case, graphics adapter 248 connects for a display device (not shown), while hard disk adapter 249 connects to and controls hard disk 250.

Thus, for example, suppose data processing system 200 is divided into three logical partitions, P1, P2, and P3. Each of PCI I/O adapters 220-221, 228-229, 236, graphics adapter 248, hard disk adapter 249, each of host processors 201-204, and memory from local memories 260-263 is assigned to each of the three partitions. In these examples, memories 260-263 may take the form of dual in-line memory modules (DIMMs). DIMMs are not normally assigned on a per DIMM basis to partitions. Instead, a partition will get a portion of the overall memory seen by the platform. For example, processor 201, some portion of memory from local memories 260-263, and I/O adapters 220, 228, and 229 may be assigned to logical partition P1; processors 202-203, some portion of memory from local memories 260-263, and PCI I/O adapters 221 and 236 may be assigned to partition P2; and processor 204, some portion of memory from local memories 260-263, graphics adapter 248 and hard disk adapter 249 may be assigned to logical partition P3.

Each operating system executing within data processing system 200 is assigned to a different logical partition. Thus, each operating system executing within data processing system 200 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or IBM i5/OS operating system may be operating within logical partition P3.

Peripheral component interconnect (PCI) host bridge 214 connected to I/O bus 212 provides an interface to PCI local bus 215. A number of PCI input/output adapters 220-221 connect to PCI bus 215 through PCI-to-PCI bridge 216, PCI bus 218, PCI bus 219, I/O slot 270, and I/O slot 271. PCI-to-PCI bridge 216 provides an interface to PCI bus 218 and PCI bus 219. PCI I/O adapters 220 and 221 are placed into I/O slots 270 and 271, respectively. Typical PCI bus implementations support between four and eight I/O adapters (i.e. expansion slots for add-in connectors). Each PCI I/O adapter 220-221 provides an interface between data processing system 200 and input/output devices such as, for example, other network computers, which are clients to data processing system 200.

An additional PCI host bridge 222 provides an interface for an additional PCI bus 223. PCI bus 223 connects to a plurality of PCI I/O adapters 228-229. PCI I/O adapters 228-229 connect to PCI bus 223 through PCI-to-PCI bridge 224, PCI bus 226, PCI bus 227, I/O slot 272, and I/O slot 273. PCI-to-PCI bridge 224 provides an interface to PCI bus 226 and PCI bus 227. PCI I/O adapters 228 and 229 are placed into I/O slots 272 and 273, respectively. In this manner, additional I/O devices, such as, for example, modems or network adapters, may be supported through each of PCI I/O adapters 228-229. Consequently, data processing system 200 allows connections to multiple network computers.

A memory mapped graphics adapter 248 is inserted into I/O slot 274 and connects to I/O bus 212 through PCI bus 244, PCI-to-PCI bridge 242, PCI bus 241, and PCI host bridge 240. Hard disk adapter 249 may be placed into I/O slot 275, which connects to PCI bus 245. In turn, this bus connects to PCI-to-PCI bridge 242, which connects to PCI host bridge 240 by PCI bus 241, which connects to bus 212.

A PCI host bridge 230 provides an interface for a PCI bus 231 to connect to I/O bus 212. PCI I/O adapter 236 connects to I/O slot 276, which connects to PCI-to-PCI bridge 232 by PCI bus 233. PCI-to-PCI bridge 232 connects to PCI bus 231. This PCI bus also connects PCI host bridge 230 to the service processor mailbox interface and ISA bus access pass-through logic 294 and PCI-to-PCI bridge 232. Service processor mailbox interface and ISA bus access pass-through logic 294 forwards PCI accesses destined to the PCI/ISA bridge 293. NVRAM storage 292 connects to the ISA bus 296. Service processor 235 connects to service processor mailbox interface and ISA bus access pass-through logic 294 through its local PCI bus 295. Service processor 235 also connects to processors 201-204 via a plurality of JTAG/I$^2$C busses 234. JTAG/I$^2$C busses 234 are a combination of JTAG/scan busses (see IEEE 1149.1) and Phillips I$^2$C busses. However, alternatively, JTAG/I$^2$C busses 234 may be replaced by only Phillips I$^2$C busses or only JTAG/scan busses. All SP-ATTN signals of the host processors 201, 202, 203, and 204 connect together to an interrupt input signal of service processor 235. Service processor 235 has its own local memory 291 and has access to the hardware OP-panel 290.

When data processing system 200 is initially powered up, service processor 235 uses the JTAG/I$^2$C busses 234 to interrogate the system (host) processors 201-204, memory controller/cache 208, and I/O bridge 210. At the completion of this step, service processor 235 has an inventory and topology understanding of data processing system 200. Service processor 235 also executes Built-In-Self-Tests (BISTs), Basic Assurance Tests (BATs), and memory tests on all elements found by interrogating the host processors 201-204, memory controller/cache 208, and I/O bridge 210. Any error information for failures detected during the BISTs, BATs, and memory tests are gathered and reported by service processor 235.

If a meaningful/valid configuration of system resources is still possible after taking out the elements found to be faulty during the BISTs, BATs, and memory tests, then data processing system 200 is allowed to proceed to load executable code into local (host) memories 260-263. Service processor 235 then releases host processors 201-204 for execution of the code loaded into local memory 260-263. While host processors 201-204 are executing code from respective operating systems within data processing system 200, service processor 235 enters a mode of monitoring and reporting errors. The type of items monitored by service processor 235 include, for example, the cooling fan speed and operation, thermal sensors, power supply regulators, and recoverable and non-recoverable errors reported by processors 201-204, local memories 260-263, and I/O bridge 210.

Service processor 235 saves and reports error information related to all the monitored items in data processing system 200. Service processor 235 also takes action based upon the type of errors and defined thresholds. For example, service processor 235 may take note of excessive recoverable errors on a processor's cache memory and decide that this is predictive of a hard failure. Based upon this determination, service processor 235 may mark that resource for de-configuration during the current running session and future Initial Program Loads (IPLs). An IPL is also sometimes referred to as a "boot" or "bootstrap load" operation.

Data processing system 200 may be implemented using various commercially available computer systems. For example, data processing system 200 may be implemented using IBM eServer iSeries Model 840 system available from International Business Machines Corporation. Such a system may support logical partitioning using an i5/OS operating system, which is also available from International Business Machines Corporation.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

With reference now to FIG. 3, a block diagram of an exemplary logically partitioned platform is depicted in which the present invention may be implemented. The hardware in logically partitioned platform 300 may be implemented as, for example, data processing system 200 in FIG. 2. Logically partitioned platform 300 includes partitioned hardware 330, operating systems 302, 304, 306, 308, and partition management firmware 310. Operating systems 302, 304, 306, and 308 may be multiple copies of a single operating system or multiple heterogeneous operating systems simultaneously running on logically partitioned platform 300. These operating systems may be implemented using IBM's i5/OS, which is designed to interface with partition management firmware, such as IBM's P-HYPE (Partition Hypervisor). i5/OS is used only as an example in these illustrative embodiments. Of course, other types of operating systems, such as IBM's AIX and Linux, may be used depending on the particular implementation. Operating systems 302, 304, 306, and 308 are located in partitions 303, 305, 307, and 309. Hypervisor software is an example of software that may be used to implement partition management firmware 310 and is available from International Business Machines Corporation. Firmware is "software" that is not accessible to the machine user or owner and is licensed as part of the physical machine.

Additionally, these partitions also include partition firmware 311, 313, 315, and 317. Partition firmware 311, 313, 315, and 317 may be implemented using initial bootstrap code, IEEE-1275 Standard Open Firmware, and runtime abstraction software (RTAS), which is available from International Business Machines Corporation. When partitions 303, 305, 307, and 309 are instantiated, a copy of bootstrap code is loaded onto partitions 303, 305, 307, and 309 by platform firmware 310. Thereafter, control is transferred to the bootstrap code with the bootstrap code then loading the open firmware and RTAS. The processors associated or assigned to the partitions are then dispatched to the partition's memory to execute the partition firmware.

Partitioned hardware 330 can include a plurality of processors, a plurality of system memory units, a plurality of input/output (I/O) adapters, and storage units, such as those shown in FIG. 2. Partitioned hardware is allocated to one of multiple different partitions, such as partitions 303, 305, 307, and 309, within logical partitioned platform 300, each of which corresponds to one of operating systems 302, 304, 306, and 308.

Partition management firmware 310 performs a number of functions and services for partitions 303, 305, 307, and 309 to create and enforce the partitioning of logically partitioned platform 300. Partition management firmware 310 is firmware that manages the logical partitions on the underlying hardware. Thus, partition management firmware 310 allows the simultaneous execution of independent OS images 302, 304, 306, and 308 by virtualizing all of the hardware resources of logically partitioned platform 300.

Service processor 390 may be used to provide various services, such as the processing of platform errors in the partitions. These services also may act as a service agent to report errors back to a vendor, such as International Business Machines Corporation. Operation of the various partitions may be controlled through a hardware management console, such as hardware management console 380. Hardware management console 380 is a separate data processing system from which a system administrator may perform various functions including reallocation of resources among the partitions.

Increasingly large symmetric multi-processor data processing systems, such as the IBM eServer p690, available from International Business Machines Corporation, DHP9000 Superdome Enterprise Server, available from Hewlett-Packard Company, and the Sunfire 15K server, available from Sun Microsystems, Inc., are not being used as single large data processing systems. Instead, these types of data processing systems are being partitioned and used as smaller systems. These systems are also referred to as logically partitioned data processing systems or virtualized data processing systems. A logically partitioned or virtualized functionality within a data processing system allows multiple copies of a single operating system or multiple heterogeneous operating systems to be simultaneously run on a single physical computing system platform. A partition, within which an operating system image runs, is assigned a subset and/or a share of the platform's resources. These platform allocable resources include one or more architecturally distinct processors with their interruption-management area, regions of system memory, and input/output (I/O) adapters. The partition's resources are represented to the operating system image by the platform's firmware.

Each distinct operating system or image of an operating system running within a platform is protected from the others such that software errors in one logical partition or virtual machine cannot affect the correct operations of any of the other partitions or virtual machines. This protection is provided by allocation controls in the system hardware and firmware for platform resources to be directly managed by each operating system image, and by mechanisms for insuring that any image cannot control any resources that have not been allocated to that image. Furthermore, software errors in the control of an operating system's allocated resources are prevented from affecting the resources of any other image. Thus, each operating system image directly controls a distinct set of allocable resources within the platform.

With respect to hardware resources in a logically partitioned data processing system, these resources are shared among various partitions. These resources may include, for example, input/output (I/O) adapters, memory DIMMs, non-volatile random access memory (NVRAM), and disk drives. Each partition may be booted and shut down over and over without having to power-cycle the entire physical computing entity.

A logically partitioned or virtualized data processing system may also be a single-level logically partitioned system, a multi-level logically partitioned system, and/or a virtualized data processing system. In multi-level systems, each logical computing entity can, in turn, be divided into multiple "second-level" entities. A second-level entity can likewise be divided into multiple "third-level" entities, and so forth. A logical computing entity comprising multiple second-level entities is referred to herein as a "first-level" logical computing entity.

An example of an entity that is subdivided into second-level entities is a logical partition in an IBM System z9 in which the IBM z/VM operating system is running, both products being available from International Business Machines Corporation. In such a partition, the z/VM operating system supports multiple second-level entities (virtual machines), each of which is capable of running any operating system that will run directly on the System z9, such as another image of the z/VM operating system, the Linux for z9 and zSeries operating system, the z/OS operating system available from International Business Machines Corporation, or others.

For purposes of clarity, the term "logical partition" as used herein may refer to a logical partition that is not supporting any second-level entities such as virtual machines, or a first-level logical partition that is supporting second-level entities such as virtual machines.

For purposes of clarity, the term "virtual machine" will be used herein to refer to a second-level or higher logical computing entity in a multi-level logically partitioned data processing system. However, the aspects of embodiments of the present invention apply equally to first-level computing entities where the aspects of the present invention are equally applicable to virtual machines that encompass first-level computing entities, such as virtual machines created by a hypervisor controlling the entire physical computing entity, as well as nested logical computing entities, it shall be understood that the embodiments of the present invention applies to such first-level virtual machines as well as to nested logical computing entities.

As used herein, a "nested logical computing entity" is any second-level or higher entity such as a virtual machine that is contained within another logical computing entity. For example, if a first-level entity comprises multiple second-level entities, each second-level entity is a nested logical computing entity. As used herein, the term "logical computing entity" refers to a logical partition or a virtual machine.

The term "logically partitioned data processing system" as used herein refers to a data processing system in which there are first-level logical partitions, with or without any second-level (or higher) virtual machines.

The term "logically partitioned data processing system" may also be used herein to refer to a virtualized data processing system in which a physical computing entity can be divided into a plurality of virtual machines.

Each logical computing entity in a logically partitioned data processing system needs at least one unique identifier to uniquely identify the entity in the plurality of computing entities in the system. Because a logically partitioned data processing system contains multiple such entities, utilization of an underlying physical hardware identifier (for example, that of an I/O adapter port) to identify each computing entity does not provide for the unique identification of each entity when I/O adapter ports are shared (for example, for reasons of economics or physical space). Moreover, manually creating sufficient numbers of unique identifiers for every computing entity in systems that can contain hundreds, thousands, or even millions of computing entities is cumbersome and impractical.

The aspects of the present invention provide an improved computer-implemented method, apparatus, and computer program product for automatically generating identifiers for logical computing entities that are unique worldwide. A unique identifier typically comprises three parts. The first part of the identifier is the prefix containing the company identifier. The company identifier identifies the manufacturer of the data processing system. The company identifier is followed by a root identifier.

The root identifier uniquely identifies the specific data processing system from the manufacturer. In other words, all data processing systems manufactured by a particular company share a common company identifier, and a unique root identifier distinguishes one system from another system manufactured by the same company, in the manner of a serial number.

The root identifier is followed by a suffix that can be used to uniquely identify a logical computing entity in a particular data processing system. Each identifier for each entity in a system will share a common company identifier. Logical computing entities within the same system will also share a portion of the common root identifier as well. However, every logical computing entity in the same data processing system requires a unique suffix distinguishing that entity from every other entity for each shared I/O adapter port in the data processing system.

In accordance with the aspects of the present invention, a combination of bits in the root identifier and the suffix comprises a unique identifier to identify logical computing entities in a computing system. Unique identifiers are generated for a logically partitioned data processing system by identifying the number of logical computing entities the data processing system is capable of supporting to form a number of identified entities. A set of unique identifiers is generated based upon the number of identified entities. A unique identifier in the set of unique identifiers is assigned to each logical computing entity for each shared I/O adapter port initialized during operation of the data processing system.

Figure 4:
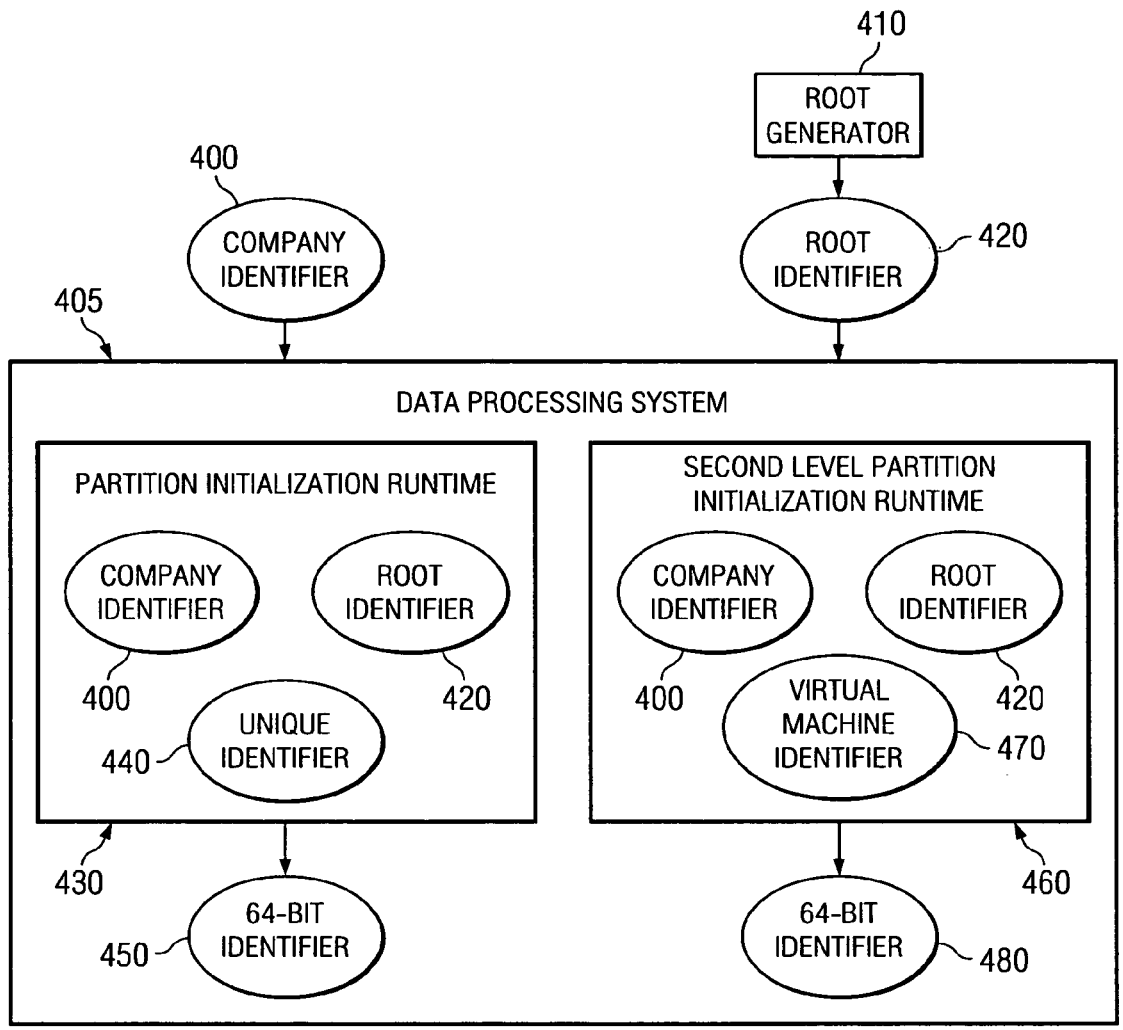
FIG. 4 is an exemplary block diagram illustrating the process of automatically generating unique identifiers in accordance with an illustrative embodiment of the present invention.

Referring now to FIG. 4, which is an exemplary block diagram illustrating the process of automatically generating unique identifiers in accordance with an illustrative embodiment of the present invention. A company identifier, such as company identifier 400, identifies the manufacturer of data processing systems. A unique company identifier is assigned to each company that manufactures data processing systems. In accordance with this illustrative example, company identifier 400 is a twenty-four-bit identifier of the manufacturer of data processing system 405.

The number of bits allocated to a company identifier is limited in these examples. Such limitations arise, for example, in protocol standards such as the Fibre Channel standard. The total number of available company identifiers is also limited. The authority that administers the assignment of company identifiers (for example, the Institute of Electrical and Electronics Engineers, or IEEE) requires that every company make efficient use of all assigned company identifiers. Therefore, a company should use a large percentage of the possible bit combinations available for the root and suffix identifiers prior to requesting a new company identifier.

During the manufacturing of data processing systems, a root generator, such as root generator 410, generates root identifiers for each data processing system in a plurality of data processing systems. Root generator 410 generates values of root identifiers based upon an algorithm. The algorithm used to generate root identifier values is dependent upon the particular type of data processing system to which the root identifier is assigned, as is described in more detail in FIG. 10 below. Root generator 410 stores root identifier values generated for a particular data processing system in nonvolatile memory in the machine during the manufacturing process.

In accordance with the illustrative example shown in FIG. 4, company identifier 400 identifies the manufacturer of data processing system 405. Root generator 410 generates root identifier 420 during the process of manufacturing data processing system 405. In these examples, root generator 410 generates unique root identifier 420 to identify data processing system 405, within a plurality of systems manufactured by a particular manufacturer. Data processing system 405 may be any computing device, as exemplified in FIGS. 1-3.

In response to receiving a request for a unique identifier for a logical partition that is given shared access to an I/O adapter port in data processing system 405, partition initialization runtime 430 generates unique identifier 440 to identify the logical partition. Partition initialization runtime 430 concatenates unique identifier 440 with company identifier 400 and root identifier 420 to form unique sixty-four-bit identifier 450. Sixty-four-bit identifier 450 uniquely identifies a logical computing entity associated with data processing system 405.

In response to receiving a request for a virtual machine identifier, second level partition initialization runtime 460 generates unique virtual machine identifier 470 based upon an algorithm. Second level partition initialization runtime 460 concatenates unique identifier 440 with company identifier 400 and root identifier 420 to form unique sixty-four-bit identifier 480. Sixty-four-bit identifier 480 uniquely identifies a logical computing entity associated with data processing system 405.

Figure 11:
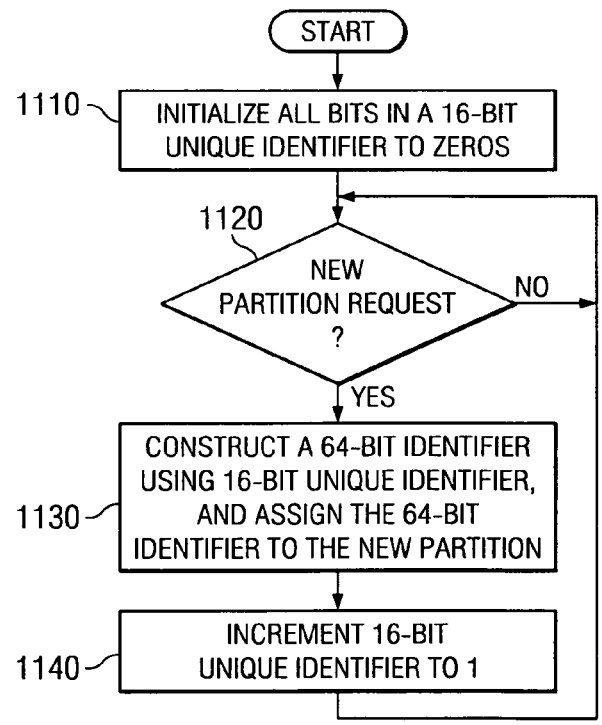
FIG. 11 is a flowchart outlining an exemplary operation of the present invention for generating unique identifiers for identifying logical partitions in a logically partitioned data processing system in accordance with an illustrative embodiment of the present invention.
Figure 12:
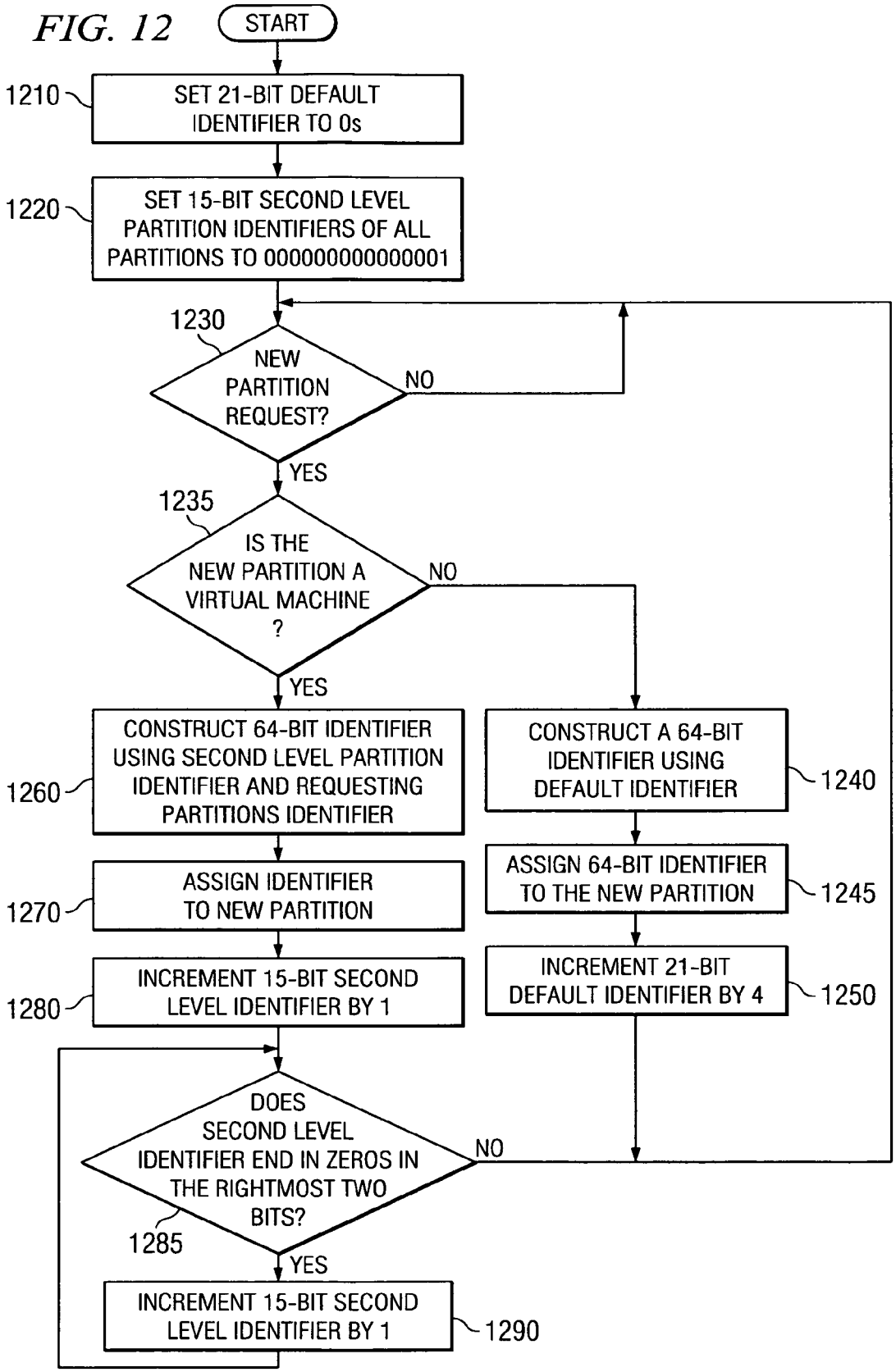
FIG. 12 is a flowchart outlining an exemplary operation of the present invention for generating unique identifiers for identifying first-level logical computing entities and second-level entities in a large data processing system in accordance with an illustrative embodiment of the present invention.

Two examples of partition initialization routines for generating unique logical computing entity identifiers, such as unique identifiers 440 and 470, are shown in FIGS. 11 and 12.

According to one embodiment of the present invention, a set of root identifiers is assigned to each physical data processing system during the manufacture of each system. The set of root identifiers contains one or more root identifiers. The number of root identifier values assigned to a particular data processing system may vary with the computing capacity of the particular machine. Thus, a data processing system capable of supporting a larger number of logical partitions and virtual machines is allocated a larger number of root identifier values than a smaller data processing system capable of supporting fewer logical partitions and virtual machines.

In accordance with the present invention, partition initialization runtime 430 and second-level partition initialization runtime 460 are embodied in a single partition initialization runtime component that is capable of generating unique identifiers for identifying both logical partitions and virtual machines. However, those skilled in the art will easily recognize that it is also possible to divide this routine into two routines—one that generates unique identifiers for logical partitions and/or virtual machines at the first level, and one that generates unique identifiers for higher-level computing entities.

In accordance with the aspects of the present invention, root generator 410 automatically generates a plurality of root identifiers for assignment to each physical data processing system in a plurality of data processing systems during manufacture of the data processing systems. Two sets of root identifiers are generated. One set of root identifier values are assigned in groups of 128 (for example) in decreasing order starting with the value $2^{23}$, and proceeding to $2^{23}-128$, $2^{23}-256$, etc. Because the first root identifier value in each group of 128 root identifier values is decremented by 128, the leftmost seven-bits of each such first twenty-four-bit root identifier are always all zeros. Another set of root identifier values are assigned individually in increasing order starting with the value 0. The next root identifier value in that set is equal to the previous root identifier value assigned plus one, and so on.

For example, in accordance with one embodiment of the present invention, a first root identifier generated by root generator 410 is 1111111111111111110000000, or FFFF80 hexadecimal. In other words, each physical data processing system is assigned a root value beginning with the highest value in the range and decremented by one hundred and twenty-eight for each machine. In this manner, each data processing system is assigned a root value beginning with the highest value in the range and decremented by one hundred and twenty-eight for each machine. Thus, in accordance with this exemplary embodiment of the present invention, each data processing system is actually assigned one hundred and twenty-eight possible values for root identifiers during the manufacturing process for use by that system in generating unique identifiers.

In accordance with an illustrative example of the present invention, a set of unique identifiers is generated based upon the seed identifier value at the time the data processing system is first initialized or configured. For example, the set of unique identifiers is generated when the data processing system is initially set up as a logically partitioned data processing system. The seed identifier is a root value generated for a particular data processing system by a root generator, such as root generator 410.

In accordance with another exemplary embodiment of the present invention, a unique identifier in the set of unique identifiers is generated after the data processing system has been initialized. For example, one or more unique identifiers are generated when a partition is created and given shared access to one or more I/O adapter ports in a logically partitioned data processing system that has already been operating as a logically partitioned data processing system, rather than when the system is first initialized and partitioned. In such a case, the unique identifier(s) from the set of unique identifiers is (are) assigned to a particular logical computing entity when the logical computing entity is defined or initialized. In the alternative, unique identifiers are not assigned to the newly added logical computing entity until after the logical computing entity is initialized. For example, a unique identifier can be assigned to a logical computing entity when the logical computing entity is being modified.

In yet another exemplary embodiment of this invention, a logical computing entity that already has been assigned a unique identifier may later request an additional unique identifier from partition runtime. For example, a logical computing entity may request an additional unique identifier when that logical computing entity begins using an additional shared I/O adapter. In such a case, the logical computing entity requires a unique identifier for utilization by each I/O adapter. Thus, an additional unique identifier can be assigned to a logical computing entity that has already been assigned one or more unique identifiers.

In accordance with an exemplary embodiment of the present invention, a number of computing entities supported by the data processing system are uniquely identified for each shared I/O port to form a number of identified entities. A set of unique identifiers is generated based upon the number of identified entities and the number of shared I/O ports accessed by each computing entity. A subset of unique identifiers from the set of unique identifiers is assigned to each computing entity. The subset of unique identifiers comprises one or more unique identifiers. A different unique identifier is associated with each I/O port accessed by the computing entity during operation of the data processing system.

It should be noted that, with the assignment of each unique identifier to a logical computing entity, the assignment must be recorded by the data processing system in nonvolatile storage so as to be saved across power cycles of the system. This is required to ensure that the same identifier is always associated with the same logical computing entity, which is necessary because the unique identifier is used within the network fabric and its connected external devices to associate access privileges with the particular logical computing entity.

A given implementation of the present invention may choose to additionally permanently associate the unique identifier with a given I/O adapter port or not. (If not so permanently associated with an I/O adapter port, a logical computing entity's resource-access privileges may be allowed to "float" among I/O ports accessible by the entity.) The association of the unique identifier with a logical computing entity should be broken only with explicit permission of the system administrator when resource access privileges have been appropriately adjusted in the fabric and its connected devices.

Figure 5:
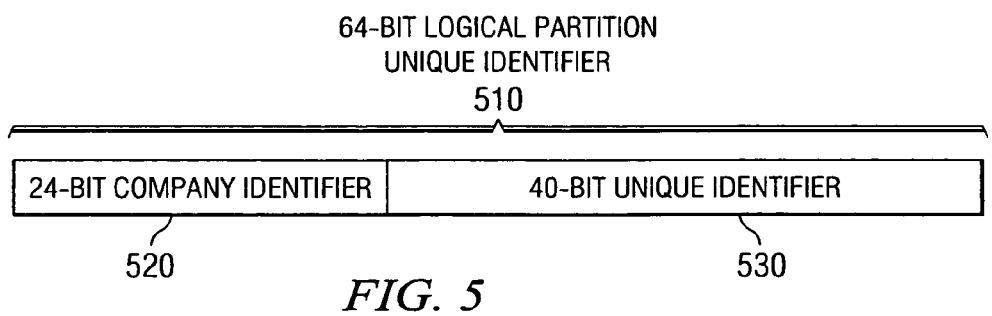
FIG. 5 is an exemplary block diagram illustrating a format for a sixty-four-bit unique identifier comprising a forty-bit unique-to-company identifier in accordance with an illustrative embodiment of the present invention.

FIG. 5 is an exemplary block diagram illustrating a format for a sixty-four-bit unique identifier comprising a forty-bit unique-to-company identifier in accordance with an illustrative embodiment of the present invention. The leftmost twenty-four bits comprise twenty-four-bit company identifier 520. As discussed above, company identifier 520 identifies the manufacturer of each data processing system. The value of company identifier 520 is constant. This value is assigned to each manufacturer of computing systems by a central authority. In this exemplary embodiment of the present invention, company identifier 520 comprises the twenty-four bits of the prefix of sixty-four-bit unique identifier 510.

Forty-bit identifier 530 uniquely identifies a particular logical partition or virtual machine within a particular data processing system. Forty-bit identifier 530 is comprised of a root identifier and a suffix. The forty-bit identifier can support widely differing numbers of combinations of identifiers for logical partitions and virtual machines, depending on the number of bits utilized by a particular algorithm to generate unique identifiers for the logical computing entities within the data processing system.

Figure 6:
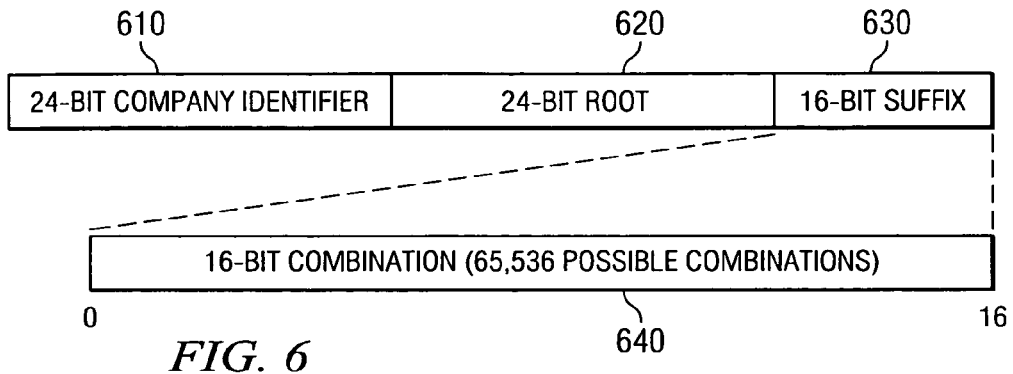
FIG. 6 is an exemplary block diagram illustrating a format for a sixty-four-bit unique identifier comprising a sixteen-bit identifier for logical partitions in a small logically partitioned data processing system in accordance with an illustrative embodiment of the present invention.

FIG. 6 is an exemplary block diagram illustrating a format for a sixty-four-bit unique identifier comprising a sixteen-bit identifier for logical partitions in a small logically partitioned data processing system in accordance with an illustrative embodiment of the present invention. A small data processing system is a system that is expected to support a relatively small number of logical computing entities. In this illustrative example, a small logically partitioned data processing system is a system that is capable of supporting no more than 65,536 logical partitions.

Company identifier 610 identifies the company that manufactures the small data processing system. A single root identifier 620 is assigned to the particular data processing system.

Sixteen-bit suffix 630 comprises an identifier for a logical partition in the data processing system. A first unique identifier is initialized to all zeros. This first identifier is incremented by one to form a next identifier. In this manner, $2^{16}$ or 65,536 possible combinations 640 of bits in the sixteen-bit identifier are available for identifying logical partitions.

In response to receiving a request for a unique entity identifier to identify a logical partition, a sixteen-bit unique identifier 630 is generated. The unique identifier identifies a logical partition within a plurality of logical partitions within a data processing system. Partition initialization runtime concatenates the unique sixteen-bit identifier 630 generated in this manner with company identifier 610 and root 620 to form a sixty-four-bit unique identifier for a logical partition. Note that as mentioned above, all of the 65,536 identifiers could have been generated at system initialization and assigned to partitions by partition runtime as each partition was initialized A partition initialization runtime can generate $2^{16}$ or 65,536 different unique sixty-four-bit logical partition identifiers to identify logical partitions. Thus, the format illustrated in FIG. 6 is sufficient for generating unique identifiers in data processing systems that support no more than 65,536 logical partitions.

In accordance with one embodiment of the present invention, the data processing system is an IBM pSeries machine. In another embodiment of the present invention, the data processing system is an IBM iSeries machine. In accordance with the examples shown, company identifier 400 comprises twenty-four-bits and root identifier 420 also comprises twenty-four-bits. However, in accordance with the aspects of the present invention, a company identifier is not limited to comprising twenty-four-bits. A company identifier may comprise varying numbers of bits for identifying a company and/or manufacturer of a particular data processing system.

Likewise, a root identifier is not limited to comprising twenty-four-bits. In accordance with the aspects of the present invention, a root identifier may comprise varying numbers of bits for identifying a particular data processing system.

Figure 7:
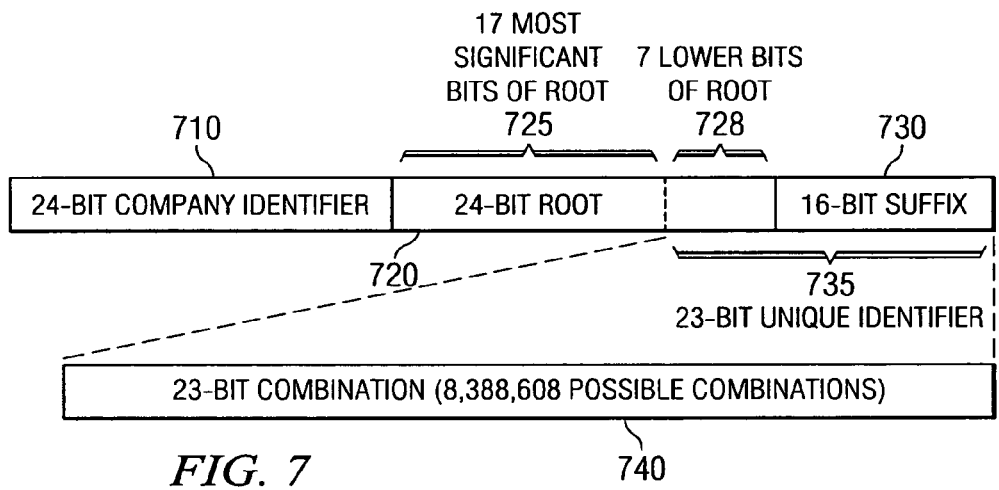
FIG. 7 is an exemplary block diagram illustrating a format for a sixty-four-bit unique identifier comprising a twenty-three-bit identifier for identifying logical partitions in a large logically partitioned data processing system in accordance with an illustrative embodiment of the present invention.

FIG. 7 is an exemplary block diagram illustrating a format for a sixty-four-bit unique identifier comprising a twenty-three-bit identifier for identifying logical partitions in a large logically partitioned data processing system in accordance with an illustrative embodiment of the present invention. In this illustrative example, a large logically partitioned data processing system is a system capable of supporting 8,388,608 logical computing entities.

A format for root identifier 720 is shown in which the leftmost seventeen-bits of the root 725 are constant and the rightmost (least-significant) seven-bits are initialized to zeros by the root generator during manufacturing. These rightmost seven-bits may be set by a partition-initialization runtime to any value. The next root identifier assigned by the root generator to a next data processing system is decremented by 128. Thus, each root identifier generated by the root generator is capable of being divided into $2^7$ or 128 possible different root identifiers. The rightmost seven-bits of root 728 are combined with the sixteen-bit-suffix 730 to form twenty-three-bit identifier 735. Thus, $2^{23}$ or 8,388,608 possible combinations 740 of bits are present for identifiers. In this manner, partition initialization runtime is capable of generating 8,388,608 different identifiers for logical computing entities in a data processing system capable of supporting 8,388,608 different such entities.

Partition initialization runtime generates a first twenty-three-bit unique identifier by initializing all twenty-three-bits of twenty-three-bit identifier 735 to zeros. This first unique identifier is incremented by one to form a next identifier.

Partition initialization runtime concatenates a twenty-three-bit identifier generated in this manner with company identifier 710 and the seventeen leftmost bits of twenty-four-bit root 720 to form a sixty-four-bit unique identifier for a logical partition. Thus, a partition initialization runtime can generate $2^{23}$ or 8,388,608 different unique sixty-four-bit identifiers for logical partitions.

The format illustrated in FIG. 7 is sufficient for generating unique identifiers in logically partitioned data processing systems that support up to 8,388,608 logical partitions and/or virtual machines. In accordance with one embodiment of the present invention, the data processing system described above is an IBM System z9 or an IBM zSeries machine.

Figure 8:
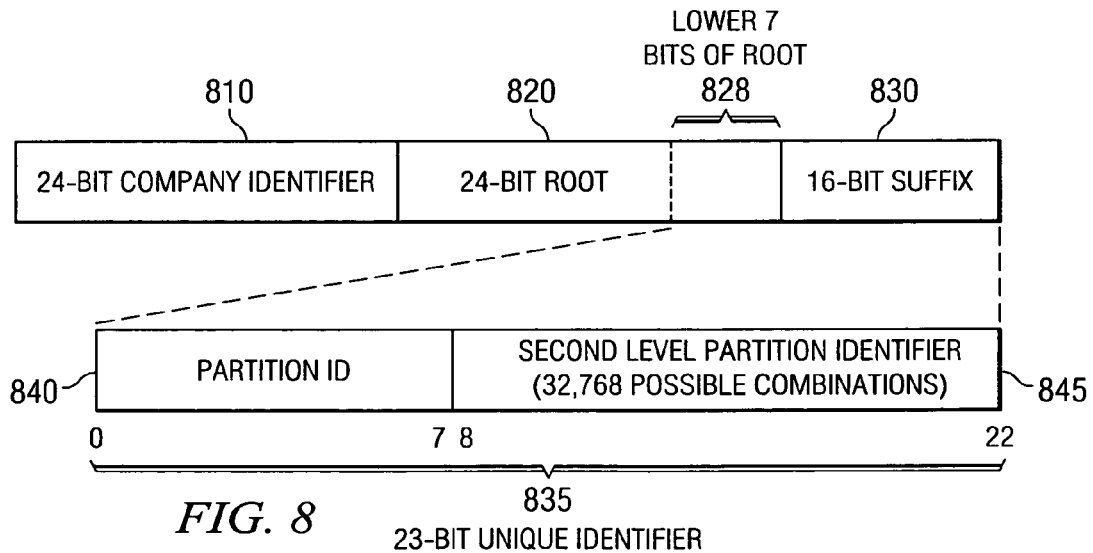
FIG. 8 is an exemplary block diagram illustrating a format for a sixty-four-bit unique identifier comprising a twenty-three-bit unique identifier for identifying second-level logical computing entities created within a logical computing entity in accordance with an illustrative embodiment of the present invention.

FIG. 8 is an exemplary block diagram illustrating a format for a sixty-four-bit unique identifier comprising a twenty-three-bit unique identifier for identifying second-level logical computing entities created within a logical computing entity, such as virtual machines instantiated within a logical partition, in accordance with an illustrative embodiment of the present invention.

In this illustrative embodiment, a format is illustrated for generating unique identifiers in a data processing system containing multi-level logical computing entities in which a single entity may itself contain a number of second-level entities, wherein second-level entities can contain third-level entities, and so forth.

As in FIG. 8, a root generator assigns a root identifier to a data processing system with the rightmost seven bits initialized to zero. However, these seven bits may be set by the partition initialization runtime to any value. The next root identifier assigned by the root generator to a next data processing system is decremented by 128. Thus, each root identifier generated by the root generator is capable of being subdivided into $2^7$, or 128, possible different root identifiers. A format for root identifier 820 is shown in which the leftmost seventeen bits of the root 820 are constant in all root values utilized by the system. The rightmost seven-bits of the root 828 are combined with the sixteen-bit suffix 830 to form a twenty-three-bit identifier 835.

The leftmost eight bits of the twenty-three-bit identifier form a first-level identifier 840. Thus, $2^8$ or 256 possible combinations of first-level identifiers are available. The rightmost fifteen-bits of the twenty-three-bit identifier form the identifier for identifying a virtual machine associated with one of the 256 possible first-level logical partitions.

Thus $2^{15}$ or 32,768 possible combinations of virtual machine identifiers 845 are available. Therefore, the unique identifier format shown in FIG. 8 is suitable for generating unique identifiers in data processing systems capable of supporting no more than 256 first-level logical partitions and 32,768 virtual machines associated with each first-level logical partition in the 256 possible first-level logical partitions.

In another embodiment of the present invention, a data processing system may require more than 256 first-level logical partitions. In such a case, a greater number of the leftmost bits of the twenty-three-bit identifier can be allocated to identifying first-level logical partitions. For example, if a system needs to support 512 first-level logical partitions, the first nine bits of the twenty-three-bit identifier 835 can be allocated to first-level partition identifier 840. In such a case, 512 possible combinations of identifiers for identifying first-level logical partitions would be available. However, only $2^{14}$ or 16,384 possible combinations are available for virtual machine identifiers used to identify virtual machines associated with each first-level logical partition.

Likewise, if a particular system will support fewer than 256 first-level logical partitions, a smaller number of leftmost bits in twenty-three-bit identifier 835 can be allocated to first-level partition identifier 840. For example, if the first seven-bits of twenty-three-bit identifier 835 are allocated to first-level partition identifier 840, $2^7$ or 128 possible combinations of first-level partition identifiers are present. In this case, $2^{16}$ or 65,536 possible combinations of bits for generating unique virtual machine identifiers are present for virtual machines associated with each first-level partition identifier 840.

Thus, in accordance with the different aspects of the present invention, the combinations of bits in the twenty-three-bit unique identifier can be varied to accommodate varying numbers of first-level logical partitions and varying numbers of virtual machines associated with each first-level logical partition.

Figure 9:
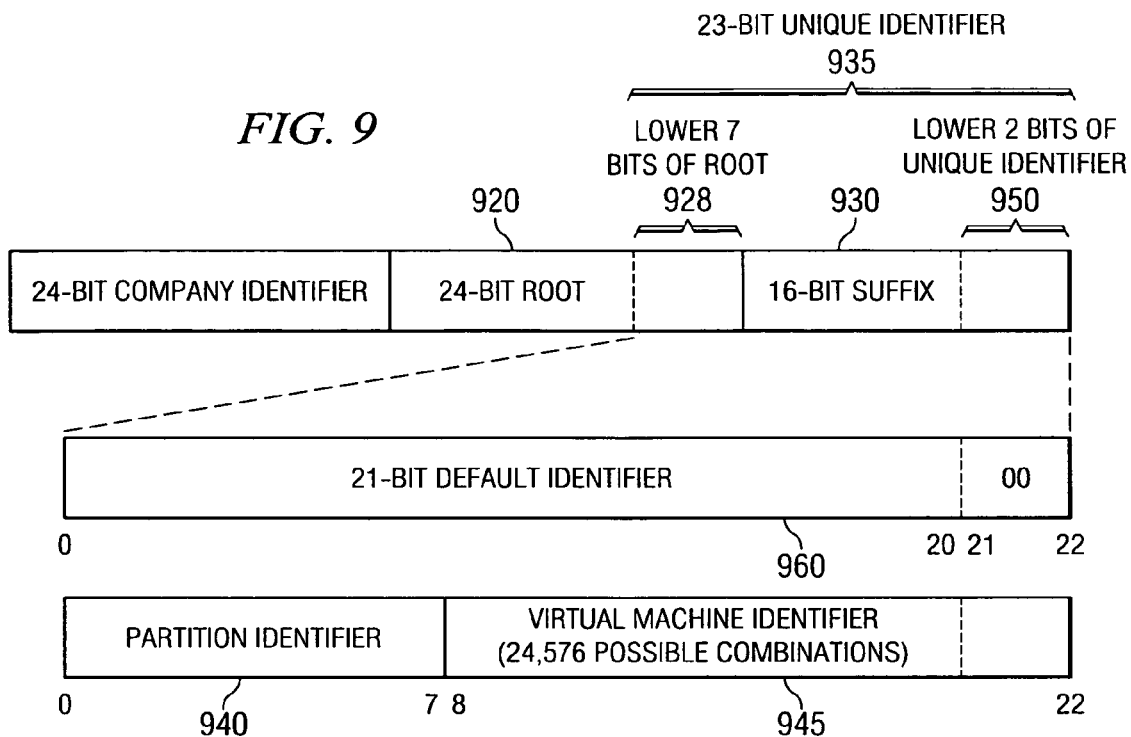
FIG. 9 is an exemplary block diagram illustrating a format for a sixty-four-bit unique identifier for identifying both logical computing entities that do not contain other logical computing entities as well as logical computing entities that do contain other entities in accordance with an illustrative embodiment of the present invention.

FIG. 9 is an exemplary block diagram illustrating a format for a sixty-four-bit unique identifier for identifying both logical computing entities that do not contain other logical computing entities as well as logical computing entities that do contain other entities in accordance with an illustrative embodiment of the present invention. A logical computing entity that contains virtual machines is a logical computing entity that contains other entities within itself.

A root generator assigns multiple values of a root identifier to a data processing system capable of supporting logical partitions both with and without associated virtual machines. In this illustrative example, rightmost seven-bits 928 of the root 920 are combined with the sixteen-bit suffix 930 to form twenty-three-bit unique identifier 935. The rightmost seventeen-bits of twenty-four-bit root 920 permit $2^{17}$ different values for root identifiers.

The leftmost eight bits of a twenty-three-bit identifier forms a first-level partition identifier 940. Thus, $2^8$ or 256 possible combinations of first-level identifiers are available. The rightmost fifteen-bits of the twenty-three-bit identifier forms the identifier for a virtual machine associated with one of the 256 possible first-level logical partitions.

In order to provide unique identifiers for logical partitions that do not have associated virtual machines, the two rightmost bits are reserved and required to be zero for this case. Thus any identifiers used for virtual machines must have one or both of the rightmost two bits with non-zero values. (See virtual machine identifiers 945.) Thus although $2^{15}$ or 32,768 combinations of fifteen-bits are possible, only three-fourths of that, three times $2^{13}$, or 24,576, possible combinations, are available for identifying virtual machines associated with first-level logical partitions.

Twenty-three-bit unique identifiers with the rightmost two bits 950 equal to zero are allocated to logical partitions that will not have any associated virtual machines. Thus, the leftmost twenty-one bits of twenty-three-bit unique identifier 935 ending in zeros in the lower two bits 950 form a twenty-one bit default identifier 960. Although there are $2^{23}$ or 8,388,608 possible combinations of bits in a twenty-three-bit identifier, only one-fourth of these, or 2,097,152, end in zeros in the rightmost two bits. Thus, 2,097,152 possible combinations of identifiers are available for twenty-one-bit default identifiers for logical partitions that do not have associated virtual machines.

In yet another embodiment of the present invention, a data processing system may support fewer logical partitions that do not have associated virtual machines. In such a case, only twenty-three-bit combinations ending in zeros in the rightmost three bits are allocated to default identifiers. In such a case, although there are $2^{23}$ or 8,388,608 possible combinations of bits in a twenty-three-bit identifier, only one-eighth or 1,048,576 of those combinations ends in zeros in the rightmost three bits. Thus, there are 1,048,576 possible default identifiers available for identifying logical partitions that do not have associated virtual machines. Likewise, a greater number of bit combinations would be available for generating virtual machine identifiers.

In accordance with the embodiments of the present invention, the number of bits used for first-level partition identifiers and virtual machine identifiers can be varied in order to accommodate greater numbers of first-level logical partitions and fewer numbers of virtual machines or fewer numbers of first-level logical partitions and greater numbers of virtual machines, as is discussed above.

Figure 10:
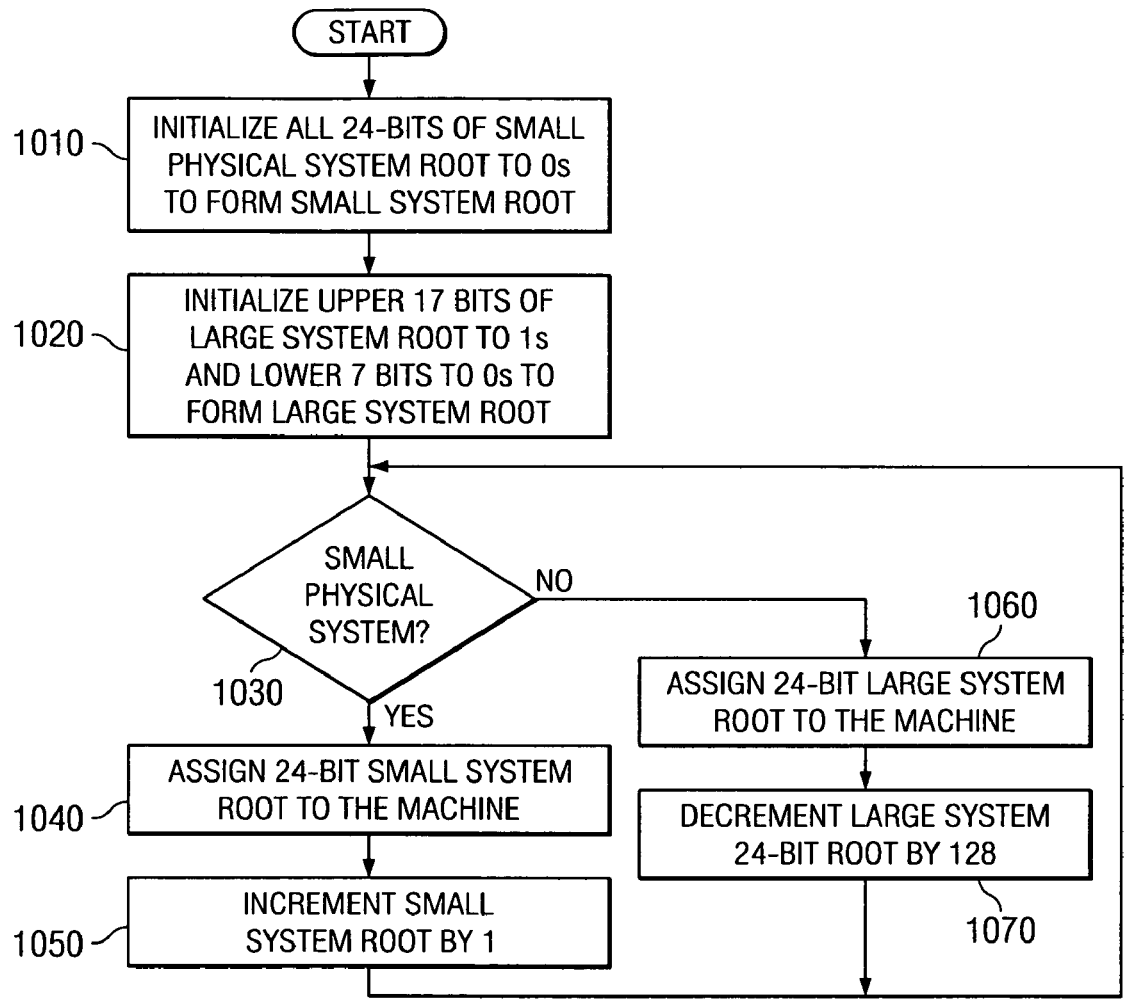
FIG. 10 is a flowchart outlining an exemplary operation of the present invention for generating unique root identifiers for identifying a data processing system in accordance with an illustrative embodiment of the present invention.

FIG. 10 is a flowchart outlining an exemplary operation of the present invention for generating unique root identifiers for a data processing system in accordance with an illustrative embodiment of the present invention. The process is implemented by root generator 410 in FIG. 4.

The root generator initializes all twenty-four-bits in a twenty-four-bit root identifier to zeros to form a small-system root identifier (step 1010). The root generator initializes the leftmost seventeen-bits to all ones and initializes the rightmost seven-bits to all zeros to form a large system root identifier (step 1020). In this illustrative example, a large system is a data processing system capable of supporting more than 65,536 logical computing entities and a small system root is capable of supporting no more than 65,536 logical computing entities.

The root generator determines if the data processing system requesting a unique identifier is a small physical system (step 1030). If the data processing system is a small one, the root generator assigns the first small-system root identifier to the machine (step 1040). The root generator increments the small-system root by one (step 1050) to form a next-available small-system root. The process then returns to step 1030.

Returning now to step 1030, if the requesting data processing system is not a small physical system, the root generator assigns a twenty-four-bit large system root to the machine (step 1060). The root generator decrements the large system root by one hundred and twenty-eight (step 1070) to form a next-available large system root. The process returns to step 1030.

FIG. 11 is a flowchart outlining an exemplary operation of the present invention for generating unique identifiers for identifying logical partitions in a logically partitioned data processing system in accordance with an illustrative embodiment of the present invention. The process is implemented by partition initialization runtime 430 in FIG. 4.

The partition initialization runtime is customized to the type of hardware for the particular data processing system. Partition initialization runtime utilizes the exemplary routine illustrated in FIG. 4 to generate a number of unique identifiers in a relatively small data processing system. In this illustrative example, the logically partitioned data processing system is capable of supporting no more than 65,536 unique logical partitions.

Partition initialization runtime initializes all the bits in a sixteen-bit unique identifier to zeros (step 1010). Partition initialization runtime determines whether the data processing system is requesting a new partition (step 1120) which will require a unique identifier. If a new partition request has not been made, the process returns to step 1120 until a new partition request is made.

If a new partition request has been made by the data processing system, partition initialization runtime constructs a sixty-four-bit identifier using the sixteen-bit unique identifier and assigns the sixty-four-bit identifier to a new partition (step 1130). The sixteen-bit unique identifier is incremented by one (step 1040) to form a next sixteen-bit unique identifier. The process returns to step 1120. Steps 1120-1140 may be repeated in order to generate a plurality of unique identifiers. Each unique sixty-four-bit identifier generated in this manner is assigned to a different logical computing entity in a plurality of logical computing entities. This process is continuous, without a termination point, until all possible combinations of unique identifiers have been utilized.

Upon receiving a request for a unique identifier for a logical computing entity in a large data processing system that may contain first-level logical partitions and virtual machines, a determination should be made as to whether the logical computing entity is a first-level logical partition. If the logical computing entity is a first-level logical partition, a twenty-three bit unique identifier is generated to identify the first level logical partition, rather than a sixteen-bit unique identifier as is illustrated above.

FIG. 12 is a flowchart outlining an exemplary operation of the present invention for generating unique identifiers for identifying first-level logical computing entities and second-level entities in a large data processing system in accordance with an illustrative embodiment of the present invention. The process is implemented by second-level partition initialization runtime 460 in FIG. 4. In this illustrative example, the logically partitioned data processing system is capable of supporting more than 65,536 unique logical partitions.

Second-level partition initialization runtime sets a twenty-one bit default identifier to all zeros (step 1210) to form a default identifier. Second-level partition initialization runtime sets fifteen-bit second-level partition identifiers of all partitions to 000000000000001 (step 1220). In other words, the first fifteen-bit second-level partition identifier is initialized to a value of one and incremented from there, to ensure that the rightmost two bits are never both zero.

Second-level partition initialization runtime makes a determination as to whether a new partition request has been made by the data processing system (step 1230). If a new partition request has not been made, the process remains at step 1230 until a new partition request is made.

If a new partition identifier request has been made, a determination is made as to whether the new partition requested is a virtual machine (step 1235). If the new partition is not a virtual machine, second-level partition initialization runtime constructs a sixty-four-bit identifier using the default identifier (step 1240). The sixty-four-bit identifier is assigned to the new partition (step 1245). Second-level partition initialization runtime increments the default identifier by four (step 1250) to form a next default identifier. The process returns to step 1230.

Returning now to step 1235, if a determination is made that the new partition is a virtual machine associated with a first-level logical partition, second-level partition initialization runtime constructs a sixty-four-bit identifier using the second-level partition identifier and the requesting logical partition identifier (step 1260). Second-level partition initialization runtime assigns the sixty-four-bit partition identifier to the new virtual machine (step 1270). Second-level partition initialization runtime increments the fifteen-bit second-level identifier by one (step 1280).

Second-level partition initialization runtime determines whether the second-level identifier ends in zero in the rightmost two bits (step 1285). If a determination is made that the rightmost two bits are both zero, the fifteen-bit second-level identifier is incremented by one (step 1290). The process then returns to step 1285. Until a determination is made at step 1285 that the second-level identifier does not end in zeros in the rightmost two bits, the process returns to step 1230. This process is continuous, without a termination point, until all possible combinations of unique identifiers have been utilized.

Thus, the aspects of the presently-claimed invention automatically assign unique identifiers to logical partitions based upon the number of logical partitions that can be supported by a particular data processing system. Unique identifiers are generated based upon a single unique physical system identifier assigned during the manufacture of the data processing system.

The range of unique identifiers is used efficiently by limiting the number of unique identifiers available within each physical system based upon the expected number of logical partitions supportable by the system. In other words, physical systems supporting a relatively small number of logical partitions are allocated a relatively small number of unique identifiers. Physical systems that are capable of supporting relatively large numbers of logical partitions, but which are built and sold in more limited numbers, are allocated a relatively large number of unique identifiers.

Thus, the aspects of the presently-claimed invention allow for efficient and automatic assignment of a number of unique identifiers to a data processing system based upon the number of logical computing entities that the system can support. A number of logical partitions and/or virtual machines supported by the logically partitioned data processing system are assigned identifiers so as to be uniquely identifiable worldwide when connected within a networking fabric.

The invention can take the form of a complete embodiment in hardware, a complete embodiment in software, or an embodiment containing both hardware and software elements. In a preferred embodiment, the invention is implemented in software, which includes but is not limited to firmware, operating-system software, etc.

Furthermore, the invention can take the form of a computer program product accessible from a computer usable or computer-readable medium providing program code for use by or in connection with a computer or any instruction execution system. For the purposes of this description, a computer usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently-available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method to generate unique identifiers for a logically partitioned data processing system by a computer, the computer-implemented method comprising:
   identifying, by the computer, a number of logical computing entities supported by a data processing system to form a number of identified entities;
   receiving, by the computer, a request for a unique identifier for a logical computing entity;
   responsive to a determination that the logically partitioned data processing system is expected to support no more than 65,536 logical partitions, generating by the computer a sixteen-bit unique identifier, wherein the sixteen-bit unique identifier identifies the logical computing entity, and wherein the logical computing entity is at least one of defined, initialized, and modified during operation of the data processing system and concatenating the unique identifier to a company identifier and a root machine identifier to form a unique sixty-four-bit identifier;
   responsive to a determination that the logically partitioned data processing system is expected to support more than 65,536 logical partitions, generating by the computer a twenty-three-bit unique identifier, wherein generating the twenty-three-bit unique identifier comprises generating the unique sixty-four-bit identifier based upon the twenty-three bit unique identifier, and wherein a lower two bits of the twenty-three-bit unique identifier are both zeros, and wherein an upper twenty-one bits of the twenty-three-bit unique identifier forms a default identifier;
   responsive to determining that the logical computing entity is not a first level logical partition, generating by the computer the twenty-three-bit unique identifier, wherein the twenty-three-bit unique identifier comprises an eight bit first-level partition identifier and a fifteen-bit virtual machine identifier, and wherein the twenty-three-bit unique identifier identifies the virtual machine; and
   incrementing, by the computer, the default identifier by four to form a next default identifier, wherein a next unique sixty-four-bit identifier is generated utilizing the next default identifier.

2. A computer program product comprising:
   a computer usable storage medium including computer usable program code stored thereon to generate unique identifiers for a logically partitioned data processing system, the computer program product comprising:
   computer usable program code to identify a number of logical computing entities supported by a data processing system to form a number of identified entities;
   computer usable program code to receive a request for a unique identifier for a logical computing entity;
   computer usable program code to generate a sixteen-bit unique identifier, wherein the sixteen-bit unique identifier identifies the logical computing entity, and wherein the logical computing entity is at least one of defined, initialized, and modified during operation of the data processing system and concatenating the unique identifier to a company identifier and a root machine identifier to form a unique sixty-four-bit identifier, in response to a determination that the logically partitioned data processing system is expected to support no more than 65,536 logical partitions;
   computer usable program code to assign an additional unique identifier to the logical computing entity responsive to a request from the logical computing entity for an additional unique identifier;
   computer usable program code to generate a twenty-three-bit unique identifier, wherein generating the twenty-three-bit unique identifier comprises generating the unique sixty-four-bit identifier based upon the twenty-three bit unique identifier, a lower two bits of the twenty-three-bit unique identifier are both zeros, and wherein an upper twenty-one bits of the twenty-three-bit unique identifier forms a default identifier, in response to a determination that the logically partitioned data processing system is expected to support more than 65,536 logical partitions; and
   computer usable program code to increment the default identifier by four to form a next default identifier, wherein a next unique sixty-four-bit identifier is generated utilizing the next default identifier.

3. An apparatus for generating unique identifiers for a logically partitioned data processing system, the apparatus comprising:
   a storage device connected to a bus, wherein the storage device contains a computer usable program product; and
   a processor, wherein the processor unit executes the computer usable program code to identify a number of logical computing entities supported by a data processing system to form a number of identified entities; receiving a request for a unique identifier for a logical computing entity; responsive to a determination that the logically partitioned data processing system is expected to support no more than 65,536 logical partitions, generating a sixteen-bit unique identifier, wherein the sixteen-bit unique identifier identifies the logical computing entity, and wherein the logical computing entity is at least one of defined, initialized, and modified during operation of the data processing system and concatenating the unique identifier to a company identifier and a root machine identifier to form a unique sixty-four-bit identifier; responsive to a determination that the logically partitioned data processing system is expected to support more than 65,536 logical partitions, generating a twenty-three-bit unique identifier, wherein generating the twenty-three-bit unique identifier comprises generating the unique sixty-four-bit identifier based upon the twenty-three bit unique identifier, wherein a lower two bits of the twenty-three-bit unique identifier are both zeros, and wherein an upper twenty-one bits of the twenty-three-bit unique identifier forms a default identifier; responsive to determining that the logical computing entity is not a first level logical partition, generating the twenty-three-bit unique identifier, wherein the twenty-three-bit unique identifier comprises an eight bit first-level partition identifier and a fifteen-bit virtual machine identifier, and wherein the twenty-three-bit unique identifier identifies the virtual machine; and incrementing the default identifier by four to form a next default identifier, wherein a next unique sixty-four-bit identifier is generated utilizing the next default identifier.

* * * * *